Aug. 3, 1954  W. C. FILLEBROWN  2,685,206
CENTERING AND CAGING MECHANISM FOR GYROSCOPES
Filed Sept. 15, 1952
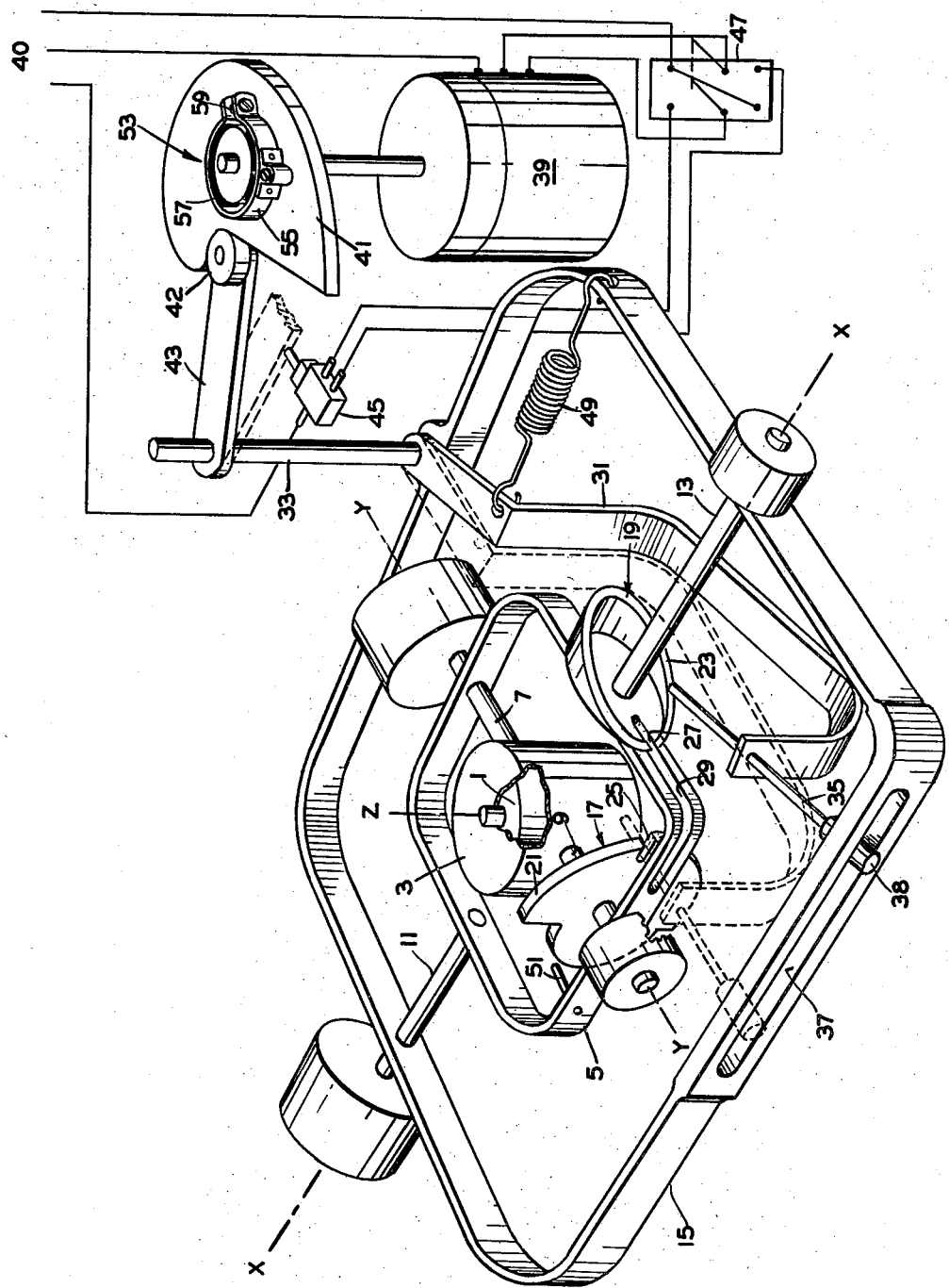
INVENTOR.
WILLIAM C. FILLEBROWN
BY
ATTORNEY Patented Aug. 3, 1954

2,685,206

UNITED STATES PATENT OFFICE 2,685,206

CENTERING AND CAGING MECHANISM FOR GYROSCOPES

William C. Fillebrown, Grand Rapids, Mich., assignor to Bendix Aviation Corporation, Teterboro, N. J., a corporation of Delaware Application September 15, 1952, Serial No. 309,613

5 Claims. (Cl. 74—5.1)

The invention relates to gyroscopic devices, such as gyro verticals, artificial horizons, etc., and more particularly to novel mechanism for centering or erecting and caging such devices.

In some gyroscopes used heretofore, the caging mechanism is drivably connected to a manually operable or motor driven actuating means by a spring to cushion the caging. When an angular torque is applied to the gimbal as in caging, the rotor casing first rotates about its axis until it engages its limit stops and thereafter the gimbal rotates to centered position. While the rotor casing is rotating to its stops, and before the gimbal begins to move angularly, the spring connecting the caging mechanism and the actuating mechanism stores energy and when the rotor casing reaches its stops, the stored energy in the spring rotates the gimbal violently to centered position.

The main object of the present invention is to provide for smooth caging of the gyroscope and thereby avoid the violent movement of the gimbal described above.

The invention contemplates a centering or erecting or caging mechanism for a gyroscope actuated by driving means operatively connected to the caging mechanism by a slip clutch or other suitable means to provide for smooth caging of the gyroscope and to avoid storing energy in the system and thereby prevent violent movement of the gimbal to centered position.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing is a schematic perspective view of a gyroscope having a novel centering or erecting and caging mechanism constructed according to the invention.

Referring now to the drawing for a more detailed description of the novel mechanism of the present invention, the mechanism is shown as applied to a gyro vertical including a rotor 1 rotatable within a case or support 3 for spinning about a normally vertical axis Z. The rotor case is mounted for oscillation about a horizontal pitch axis Y within a gimbal 5 by trunnions 7, 9. The gimbal is mounted for oscillation about a second horizontal roll axis X perpendicular to axis Y by trunnions 11, 13 supported by a housing or frame 15. The gyroscope rotor has three degrees of freedom, and the instrument, when mounted on a craft, has its trunnions 11, 13 extending parallel to the longitudinal craft axis and its trunnions 7, 9 extending parallel to the transverse craft axis.

The novel caging and centering apparatus of the present invention includes a cam 17 secured to trunnion 9 within gimbal 5 and oscillating with the rotor case about pitch axis Y. A cam 19 is secured to trunnion 13 and oscillates with gimbal 5 about roll axis X. Cams 17 and 19 have cam faces 21 and 23, respectively. Cam faces 21 and 23 have detents 25 and 27, respectively, and gimbal 5 has a slot 29 extending lengthwise thereof between the detents for the purposes described hereinafter.

A support 31 is rigid with a pin 33 pivoted to frame 15 and swings between the uncaging position shown in solid lines and the caging position shown in broken lines. A rod-like cam follower 35 is mounted on the support and successively engages both cam faces 23, 21 as support 31 pivots to caging position. A slot 37 in frame 15 receives a roller 38 rotatable on one end of cam follower 35 and guides the cam follower and support as it swings about pin 33. As support 31 pivots toward caging position, cam follower 35 engages cam face 23 and exerts a precessing force on the gyroscope which causes rotor case 3 to rotate about the Y axis until cam face 21 engages a stop pin 51. Cam follower 35 then rides on cam face 23 and rotates gimbal 5 about roll axis X until cam follower 35 is positioned in detent 27, whereupon gimbal 5 is centered. Further pivotal movement of support 31 causes cam follower 35 to enter slot 29 in gimbal 5 and ride on cam face 21 and rotate rotor case 3 about the pitch axis Y until cam follower 35 is positioned in detent 25, whereupon the rotor case is centered about both axes.

Support 31 may be pivoted from the solid line uncaging position to the broken line caging position by a motor 39 rotating a cam 41 which engages a cam follower 42 on a lever 43 fixed to pin 33. The motor is energized from a three-phase power source 40. A single-pole-double-throw limit switch 45 and a double-pole-double-throw manual switch 47 are connected in series with the motor and one phase of the power source and switch 47 also is connected in series with the motor and a second phase of the power source.

Upon closing switch 47, motor 39 is energized and cam 41 pivots lever 43 until support 31 is in caging position, whereupon the lever operates switch 45 and stops motor 39. The gyroscope is uncaged by moving switch 47 to the opposite pole whereupon motor 39 is again energized and rotates cam 41 in the opposite direction and a spring 49, having one end attached to support 31 and its other end attached to frame 15, pivots support 31 to uncaged position. Motor 39 stops when support 31 is in uncaged position and lever 43 releases limit switch 45. The support may be pivoted again to caging position by motor 39 when switch 47 is again moved to the opposite pole.

The gyroscope described above corresponds generally to the gyroscope shown and described in applicant's earlier Patent No. 2,580,748 issued January 1, 1952, and assigned to the same assignee as the present application. However, in the gyroscope described above, when cam follower 35 engages cam 19, rotor casing 3 pivots about the Y axis until the associated cam 17 engages stop pin 51 and, during this time, the gimbal does not rotate about its axis. Either the motor must stall or an excessive force may be exerted on the caging mechanism and cause the mechanism to fail.

As mentioned above, a spring is sometimes used to drivingly connect the motor and the caging mechanism, but during the time the rotor casing is rotating to its stops, the spring stores energy. The energy stored in the spring is suddenly released when the gimbal begins to rotate and the gimbal is moved violently to centered position.

To overcome these difficulties, in the present embodiment of the invention a slip clutch 53 drivingly connects the caging mechanism to the motor. Cam 41 is drivingly connected to motor 39 by slip clutch 53 which comprises a friction element 55 secured to the cam and in driving engagement with a drum 57 fixed to motor 39. The frictional engagement between element 55 and drum 57 may be varied by adjusting a screw 59. With the novel arrangement described, when the gimbal resists movement of cam follower 35 during rotation of rotor casing 3 to its limit, drum 57 rotates relative to friction element 55 without stalling motor 59 and without storing energy in the system. When gimbal 5 rotates after rotor casing 3 reaches its limit, then motor 39 smoothly drives the gimbal to centered position through the friction clutch.

The caging mechanism described herein has all the advantages of those set forth in applicant's earlier patent mentioned above and the invention provides for smooth caging of the gyroscope and avoids excessive force being exerted by the motor on the caging mechanism.

Although but one embodiment of the invention has been illustrated and described in detail, it is to be expressly understood that the invention is not limited thereto. Various changes can be made in the design and arrangement of the parts without department from the spirit and scope of the invention as the same will now be understood by those skilled in the art.

I claim:

1. In a gyroscope having a rotor spinning in a support about one axis and means including a gimbal mounting the support for rotation about mutually perpendicular axes other than the spin axis, caging means for positioning the gimbal and the support with the rotor spin axis in a predetermined attitude, driving means for operating said caging means, and means operatively connecting said driving means and said caging means including means providing for relative movement of said driving means and said caging means without storing energy therein when movement of said caging means is prevented.

2. In a gyroscope having a rotor spinning in a support about one axis and means including a gimbal mounting the support for rotation about mutually perpendicular axes other than the spin axis, caging means for positioning the gimbal and the support with the rotor spin axis in a predetermined attitude, driving means for operating said caging means, and means operatively connecting said driving means and said caging means and including a friction clutch providing for relative movement of said driving means and said caging means without storing energy therein when movement of said caging means is prevented.

3. Structure as described in claim 2 including means for adjusting the friction clutch to vary the force transmitted by the driving means to the caging means.

4. A caging and centering device for a gyroscope comprising in combination with a rotor adapted for spinning in a support about one axis, and means including a gimbal mounting said support for freedom about mutually perpendicular axes other than the spin axis, of means including a member rotatable with said gimbal, a second member rotatable with said support, and an element for engaging both of said members to move said gimbal and said support to centered position, driving means for moving said element into engagement with said members, and means operatively connecting said driving means and said element and including means providing for relative movement of said driving means and said element without storing energy therein when movement of said element is prevented.

5. In a gyroscope having a rotor spinning in a support about one axis and means including a gimbal mounting the support for rotation about mutually perpendicular axes other than the spin axis, cam-like members rotatable with the gimbal and with the support, an element for successively engaging said cam-like members to position the gimbal and the support with the rotor spin axis in a predetermined attitude, driving means for moving said element into engagement with said cam-like members, and means operatively connecting said driving means and said element including a friction clutch providing for relative movement of said driving means and said element without storing energy therein.

References Cited in the file of this patent

UNITED STATES PATENTS

| Number | Name | Date |
|---|---|---|
| 2,441,307 | Alkan | May 11, 1948 |
| 2,507,451 | Molnar et al. | May 9, 1950 |
| 2,524,553 | Wendt | Oct. 3, 1950 |
| 2,580,748 | Fillebrown | Jan. 1, 1952 |